(12) United States Patent
Khedkar et al.

(10) Patent No.: US 6,748,369 B2
(45) Date of Patent: Jun. 8, 2004

(54) METHOD AND SYSTEM FOR AUTOMATED PROPERTY VALUATION

(75) Inventors: Pratap Shankar Khedkar, Philadelphia, PA (US); Piero Patrone Bonissone, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/337,285

(22) Filed: Jun. 21, 1999

(65) Prior Publication Data

US 2002/0147695 A1 Oct. 10, 2002

(51) Int. Cl.[7] ............................. G06F 15/18; G06G 7/00
(52) U.S. Cl. ............................. 706/6; 706/52; 706/59
(58) Field of Search ........................... 706/6, 52, 59, 706/25; 705/10; 382/224; 708/801

(56) References Cited

U.S. PATENT DOCUMENTS

| | | | | |
|---|---|---|---|---|
| 5,515,477 A | * | 5/1996 | Sutherland | 395/27 |
| 5,630,018 A | * | 5/1997 | Hayashi et al. | 395/22 |
| 6,078,911 A | * | 6/2000 | Bonissone et al. | 706/52 |
| 6,115,694 A | * | 9/2000 | Cheetham et al. | 705/10 |
| 6,141,648 A | * | 10/2000 | Bonissone et al. | 705/10 |
| 6,178,406 B1 | * | 1/2001 | Cheetham et al. | 705/10 |

OTHER PUBLICATIONS

Jeannette Lawrence, Introduction to Neural Networks, 6th edition, Jul. 1994, Calfornia Scientific Software Press, p. 210.*

* cited by examiner

Primary Examiner—Ramesh Patel
Assistant Examiner—Joseph P. Hirl
(74) Attorney, Agent, or Firm—David C. Goldman; Patrick K. Patnode

(57) ABSTRACT

A method and system for automating a process for valuing a property that produces an estimated value of a subject property, and a reliability assessment of the estimated value. The process is a generative artificial intelligence method that trains a fuzzy-neural network using a subset of cases from a case-base, and produces a run-time system to provide an estimate of the subject property's value. A network-based implementation of fuzzy inference is based on a system that implements a fuzzy system as a five-layer neural network so that the structure of the network can be interpreted in terms of high-level rules. The neural network is trained automatically from data. IF/THEN rules are used to map inputs to outputs by a fuzzy logic inference system. Different models for the same problem can be obtained by changing the inputs to the neuro-fuzzy network, or by varying its architecture.

10 Claims, 4 Drawing Sheets

METHOD AND SYSTEM FOR AUTOMATED PROPERTY VALUATION

BACKGROUND OF THE INVENTION

The present invention relates generally to property valuation and more particularly to automated property valuation.

Property valuation is a process of determining a dollar estimate of a property's value for given market conditions. The value of a property changes with market conditions. Consequently, a property's value is often updated to reflect changes in market conditions, including for example, recent real estate transactions.

Property valuations have many applications. For example, many financial institutions grant new mortgages to homebuyers, and purchase mortgage packages, which can contain hundreds of mortgages, on the secondary market as investments. Property valuations are usually necessary to grant most new mortgages, as well as to evaluate mortgage packages that may be available for purchased. By way of further example, property valuations are also used to guide buyers and sellers with making purchasing decisions, and are needed for a variety of insurance purposes.

The current process for valuing properties usually requires an on-site visit by a human appraiser, can take several days, and cost hundreds of dollars per subject property. The process usually used by appraisers is a sales comparison approach, which consists of finding comparables (i.e., recent sales that are comparable to the subject property, using for example sales records), contrasting the subject property with the comparables, adjusting the comparables' sales price to reflect the differences from the subject property, using for example, heuristics and personal experience, and reconciling the comparables' adjusted sales prices to derive an estimate for the subject property, using any reasonable averaging method.

The human appraisal process is slow and expensive for multiple appraisals, which are often required by banks to, for example, update their loan and insurance portfolios, verify risk profiles of servicing rights, or evaluate default risks for securitized mortgage packages. Consequently, the appraisal process for multiple valuations is currently estimated, to a lesser degree of accuracy, by sampling techniques.

SUMMARY OF THE INVENTION

Thus, there is a particular need to automate the valuation process. The present invention is a method and system for automating the valuation process that produces an estimated value of a subject property that is based on a generative artificial intelligence method that trains a fuzzy-neural network using a subset of cases from a case-base, and produces a run-time system to provide an estimate of the subject property's value.

In one embodiment, the system is a network-based implementation of fuzzy inference based on a system that implements a fuzzy system as a 5-layer neural network so that the structure of the network can be interpreted in terms of high-level rules. The neural network is trained automatically from data. IF/THEN rules are used to map inputs to outputs by a fuzzy logic inference system. Different models for the same problem can be obtained by changing the inputs to the neuro-fuzzy network, or by varying the network's architecture.

DETAILED DESCRIPTION OF THE INVENTION

Figure 1:
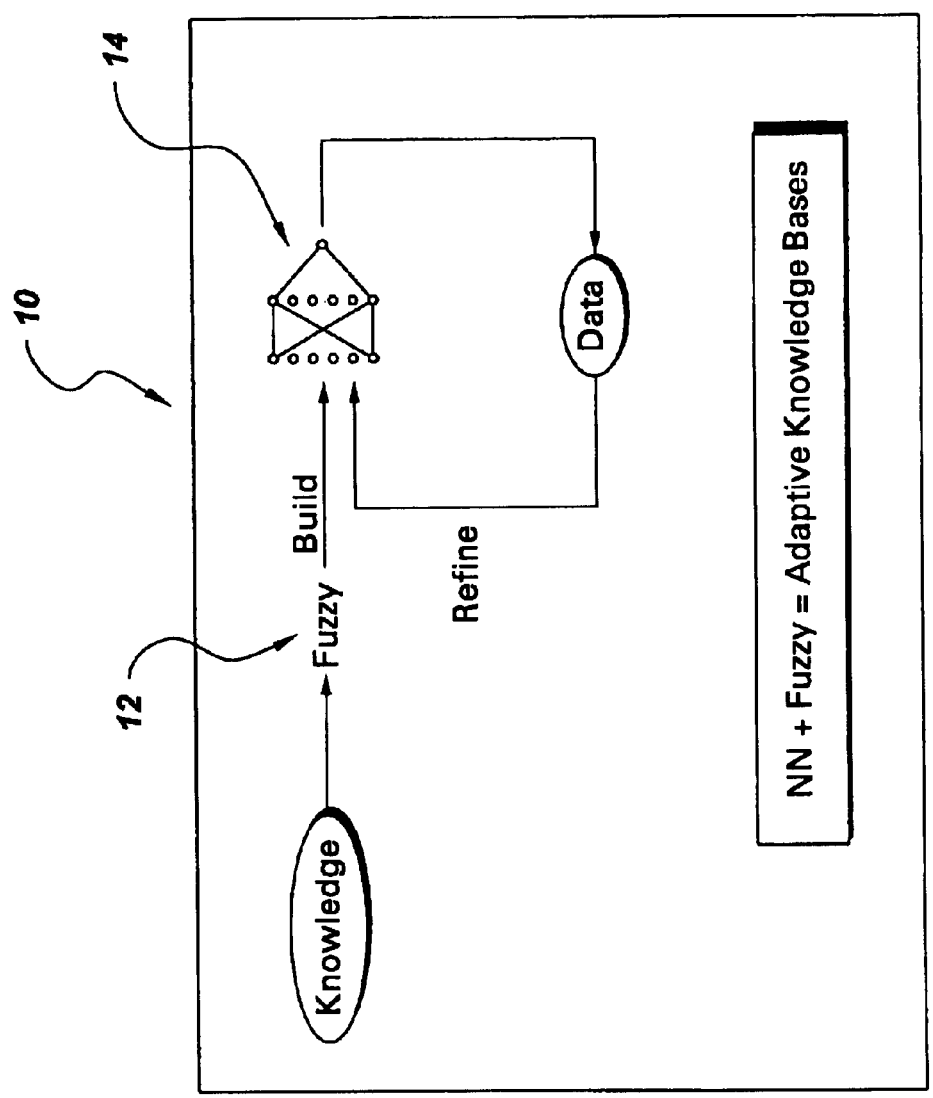
FIG. 1 shows a schematic of the AIGEN system.

Referencing FIG. 1, the AIGEN system 10 is a generative system based on a combination of fuzzy logic systems 12 and neural networks 14. The AIGEN system 10 is a network-based implementation of fuzzy inference based on a system that implements a fuzzy system as a five-layer neural network so that the structure of the network can be interpreted in terms of high-level rules. The neural network 14 is trained automatically from data.

Figure 2:
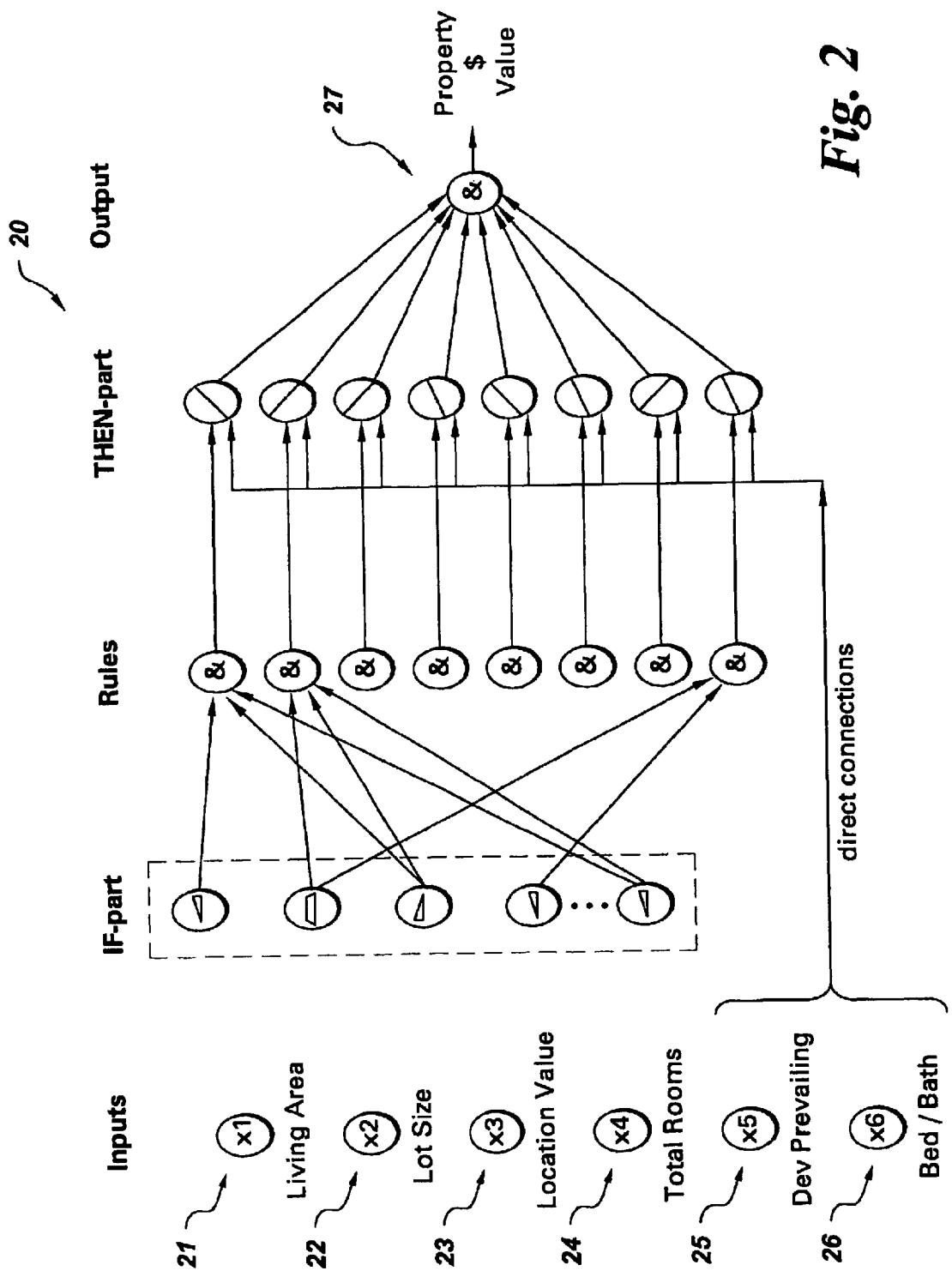
FIG. 2 shows a schematic of the architecture of the AIGEN system.

FIG. 2 shows the architecture 20 used to output an estimate of the subject property's value. The output may comprise linear functions of variables that do not necessarily occur in the input (i.e., segment the input space on a proper subset of the total variable set only and use a cylindrical projection of that segmentation for the whole space).

Figure 3:
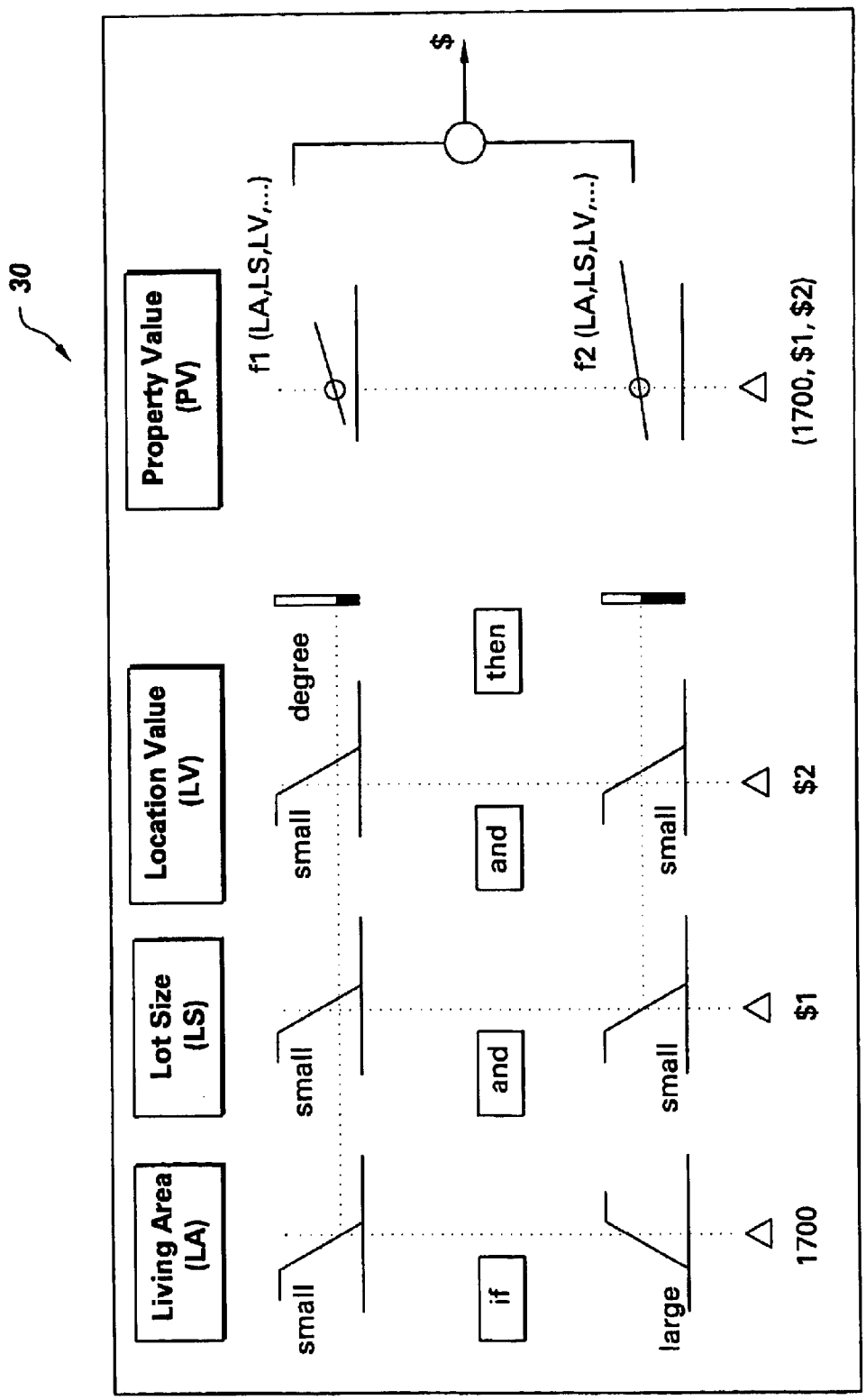
FIG. 3 shows a schematic of the fuzzy interference process for the AIGEN system.

FIG. 3 shows a schematic 30 for the fuzzy inference process, where the rules have the following form:

$$\text{Rule 1: IF } x \text{ is } A_1 \text{ and } y \text{ is } B_1 \text{ THEN } z \text{ is } f_1(x,y) \quad (1)$$

$$\text{Rule 2: IF } x \text{ is } A_2 \text{ and } y \text{ is } B_2 \text{ THEN } z \text{ is } f_2(x,y) \quad (2)$$

The two variables x and y take on real values. The predicate $A_1$ against which x is matched is a fuzzy set rather than a crisp value or an interval. All the sets $A_i$ and $B_i$ above are fuzzy sets. The IF part is referred to as the antecedent or precondition of the rule, and the THEN part is the consequent or postcondition.

The IF/THEN rules are used to map inputs to outputs by a fuzzy logic inference system that works in several steps. First, the inputs are matched against the fuzzy sets $A_i$ and $B_i$. Second, the degree of applicability $w_i$ of each rule is determined by multiplying together the degrees to which that rule's antecedent clauses match the given input. Third, the outputs recommended by each rule are determined by evaluating $f_i(x,y)$ on the input. Finally, the output is defuzzified by combining the outputs of all rules by a normalized, weighted sum, where the weight of a rule is its degree of applicability $w_i$.

The specific form used for f(x,y) is a linear function of the inputs, such that the general rule is:

$$\text{Rule i: IF } x \text{ is } A_i \text{ and } y \text{ is } B_i \text{ THEN } z \text{ is } c_{i0}+c_{i1}x+c_{i2}y \quad (3)$$

Such a rule is referred to as a TSK-type rule. A special case of equation (3) is when all $c_{ij}$ except $c_{i0}$ are 0, in which case each rule recommends a fixed number. The inference procedure with TSK-type rules yields:

$$z=\Sigma_i w_i(c_{i0}+c_{i1}x+c_{i2}y)/\Sigma_i w_i \quad (4)$$

where $w_i$ is the weight of Rule i, computed as a weighted sum.

The antecedent fuzzy membership functions are given by:

$$\mu_A(x)=1/(1+((x-c)/a)^{2b}) \quad (5)$$

The membership function given by equation (5) is centered symmetrically around c, has a width controlled by a, and has a curvature controlled by b. For b=∞, a crisp interval [c−a, c+a] is obtained. For b→∞, the set A tends to a non-fuzzy interval [c−a, c+a]. For b=0, the membership function (i.e., curve) does not bend at all. Although an initial value of b=2 is preferably used, the selection of the initial value of b is not critical as the system 10 will change the value of b if required by the data. Consequently, the tuning of the value of b is not critical.

The weight $w_i$ of each rule is obtained by multiplying the $\mu(x)$ of the two clauses in that rule's IF part. The choice of granularity (i.e., how many fuzzy functions per axis) is governed by the tradeoff between simplicity and accuracy. A high number of rules leads to a more "folded" surface and is preferably avoided unless it is necessary for fitting the data. Preferably, up to two membership functions per input dimension are used.

The system's 10 architecture 20 is based on the number of membership functions assigned to each input dimension. For example, if six inputs are used, and two membership functions are assigned to four of the inputs, the network will have six input units, eight units in the first layer (which come from the two membership functions for each of the four variables), sixteen units in the next two layers (which come from every combination of one membership function from each of the four inputs, i.e., 2×2×2×2=16 rules), and one summation unit to produce the output in the output layer. Each of the sixteen rules has a TSK-type consequent which depends on all six inputs. Since each antecedent membership function has three degrees of freedom (a, b, and c), and each consequent has seven coefficients, there are one hundred thirty-six degrees of freedom (8×3+16×7=136).

Once the architecture is constructed, the parameters are initialized in a reasonable manner instead of randomly as in neural networks. For example, the membership functions can be spaced at uniform distances over the axis so as to cover the range of the data points. The consequent linear functions are initialized to zero.

A variant of the gradient descent technique is used to train the network 14 based on training data in order to minimize the mean squared error between the network's 14 outputs and the desired answers, when presented with the data points in the training set. The training of the network 14 includes several steps. First, a sample point in a training data set is presented to the network 14 and the output is computed. Second, the error between the network's 34 output and the desired answer is computed. Third, holding the IF-part parameters fixed, the optimal values of the THEN-part parameters are solved using a least-mean-squares optimization method. A recursive Kalman filter method is preferably used. Fourth, the effect of the IF-part parameters on the error is computed using derivatives of the functions implemented by intermediate layers. Fifth, using the information obtained, the IF-part parameters are changed by small amounts so that the error at the output is reduced. Finally, the above steps are repeated several times using the entire training set, until the error is sufficiently small. Repeating the above steps (i.e., training) is stopped when the error becomes fixed or decreases very slowly. The resulting network 14 is interpreted as a fuzzy rulebase, with each parameter in the network 14 having a definite meaning in terms of the fuzzy sets or consequent functions. Notably, learning speed is very fast compared to the conventional neural net paradigm. Additional data, if available, can be used to further train the network 14 using the same backpropagation-type algorithm. The resulting surface is very well-behaved and provably smooth. The rule base is extremely compact, so a large number of models of the network can be stored easily.

Different models for the same problem can be obtained by changing the inputs to the neuro-fuzzy network, or by varying the network's architecture. For example, one could make the dollars/sq. ft. value for the property as the dependent variable, use a network to compute this value, and then multiply this value by the living area to generate the predicted price. By way of another example, one could make the logarithm of the sale price the dependent variable (i.e., the output of the network), or one could use different combination of property attributes as the inputs to a network. The choice of which model to deploy depends on the evaluation or error metric. Preferably, models which estimate a property's value directly, or which estimate a property's value using the sale price per unit of building area, are used.

The AIGEN system 10 uses a network 14 comprising six inputs 21–26 and one output 27. Four of the inputs 21–24 are used to partition the input space into sixteen overlapping sets, and give rise to sixteen fuzzy rules. The remaining two inputs 25, 26 are used only by the consequents of the rules. Each of the sixteen fuzzy rules provide an output (i.e., a prediction based on the four input variables), and the outputs are then combined using interpolative reasoning to produce an estimate of the subject property's value 27. The overall map from six inputs to one output is a nonlinear, differentiable map that is constructed by melding together sixteen hyperplanes in a seven dimensional space. For example, the form of a rule can be: IF lot_size is small and living_area is small and locational_value is high . . . THEN price is f( ), where f( ) is a linear function of the six input variables.

The data set of property values used to train the AIGEN system 10 is preferably restricted to a certain price range to eliminate obvious outliers. Consequently, the system 10 is preferably not used to estimate the value of a property that is outside the restricted price range. The system 10 will output a price estimate if given a property that is outside the price range, however, the output will be bound by the range and a warning will be issued to the user of the system 10. Preferably, one system is used for the entire price range, as opposed to separate systems for each range of price.

The sixteen fuzzy rules have one hundred twelve degrees of freedom in the consequent. This is a large share of the dimensionality of the parameter space, which uses a variant of the Kalman filtering algorithm to train the parameters in the consequent. Preferably the consequent partially (four inputs =eight parameters) is trained using in the interleaved backpropagation process described above, followed by a final batch phase where all one hundred twelve consequent parameters are retrained while holding the antecedent parameters constant. The training set is preferably error-free and more or less randomly distributed so as not to bias the system 10. The specific size of the training set is not significant. Preferably, the training data set includes ten times the number of degrees of freedom (e.g., 10×136=1, 360). Preferably, only a small part of the total data is used to avoid overfitting of the data.

Inputs to the system are based on seven attributes of a property: total_rooms 24, num_bedrooms, num_baths, living_area 21, lot_size 22, locational_value 23, and deviation_from_prevailing 25. The number of bedrooms and bathrooms are combined to produce a bedrooms/bathrooms ratio 26 that is fed along with the other five values to the system.

Figure 4:
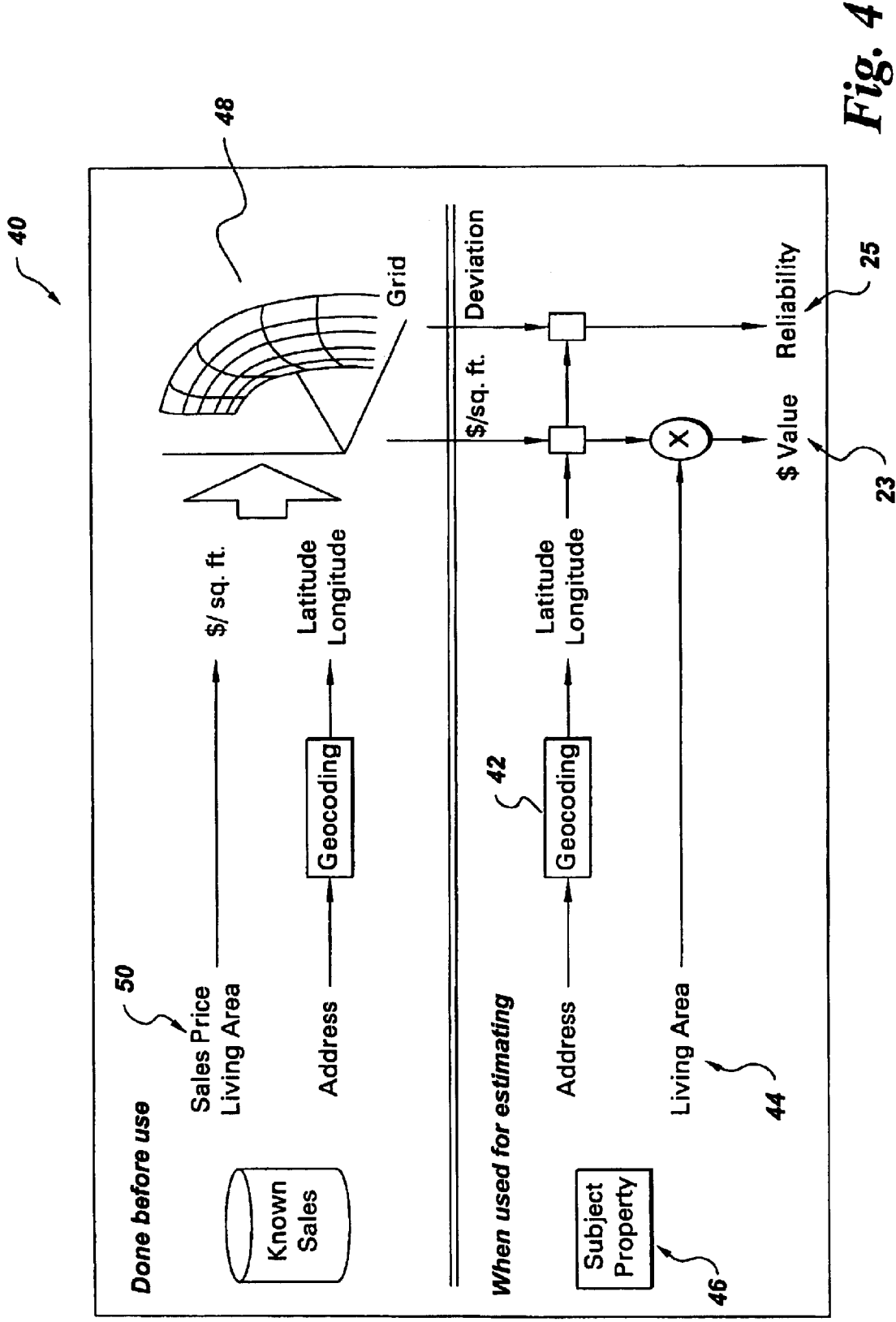
FIG. 4 shows a schematic of the LOCVAL system.

Locational_value 23 is preferably provided by a system referred to as LOCVAL. Referring to FIG 4, the LOCVAL system 40, which can be implemented in the form of a computer program, takes as an input a valid, geocoded address 42 and a living area 44 (in sq. ft.) for the subject property 46, and outputs two values, the locational_value 23, which is an estimated value of the subject property, and deviation_from prevailing 25, which is the standard deviation for properties within the selected geographic region. If either input is missing, or clearly out-of-range, LOCVAL 40 does not provide an output. The output is based on the values of all properties within a certain geographic region, for example a neighborhood, city, county or state. In this regard, all known, filtered historical sales 50 in a geographic region are used to construct a smooth surface 48 spanning a geographic region that represents a dollar/sq. ft. value and deviation at every point of longitude and latitude within the selected geographic region. A smoothing function 48 is derived using radial basis functions that drop off exponentially with distance and a "space" constant of about 0.15–0.2 miles. The smoothing function 48 is described as the weighted sum of radial basis functions (all of the same width), each situated at the site of a sale within the past one year and having an amplitude equal to the sales price. Consequently, based on the inputs of a valid, geocoded address 42 and a living area for the subject property 44, an estimate of the subject property's value 23 and corresponding reliability 25 are obtained.

Of the six inputs, total_rooms 24, living_area 21, lot_size 22, locational_value 23 are used to partition the space into sixteen fuzzy regions. The output is the dollar value of the house. Alternatively, a system can produce the $\log_{10}$ (sale_price) as an output. In this embodiment, the inputs are: $\log_{10}$(total_rooms), $\log_{10}$(lot_size), $\log_{10}$(living_area), $\log_{10}$(locational value), bedrooms/bathrooms, and deviation_from_prevailing. The first four inputs are used to partition the input space. Alternatively, a system can produce the sale_price per square foot of living area as an output. In this embodiment, the inputs are: total_rooms, locational_value/living_area, living_area, lot_size, bedrooms/bathrooms, and deviation_from_prevailing. The output (i.e., the estimated dollar value) is computed by multiplying the output of the system by the living area of the subject property.

Validation is done by testing the system 10 on the entire data set (filtered to remove atypical properties) available from a data source. The filters used for testing are the same as the ones used for screening the training set. As discussed above, the training metric was the mean squared dollar difference between the actual and estimated price. The median of relative error can be used as the principal test metric. For the purposes of evaluation, the error E, for a given test property, is the difference in the predicted sale price and the actual sale price, normalized by the actual price (all in $):

$$E = (\text{actual\_price} - \text{estimate})/\text{actual\_price} \quad (6)$$

The error E is the absolute-value relative error in sale price per property. Various statistics related to E, e.g. its mean (with or without the absolute value), median, percentiles, standard deviation, probability mass function, cumulative distribution function, etc., can be analyzed to evaluate E. Preferably, the median (because it is robust to outliers), and the probability distributions (since they encapsulate the entire set of errors in one diagram) are analyzed.

A bad estimate of a property's value is most likely due to two reasons. The first is that the sale price itself is fraudulent or due to a non-arms-length transaction. For example, a large property, having a high TotalValue and TaxAmount that sold for a small purchase price. For such properties, the system 10 will rightly predict a high sale price, but since the actual price happened to be low, a very large relative error will result. Preferably, such sales are filtered from the dataset. More preferably, filters based on TaxAmount, TotalValue and locational_value 23 are used to filter out obviously bad sales during the training set selection process. The second is a genuine mistake that is caused by having an incorrect locational_value 23 prediction. The locational value estimator 40 is well correlated to the actual price. Consequently, the AIGEN system 10 uses this estimator 40 as an input and gives it a significant weight. When locational_value 23 is predicted wrongly, the error propagates through to the system's 10 output. A related error is caused by unusual properties where the physical characteristics are too extreme to conform to the typical cases on which the system 10 has been trained.

Preferably, an automated module is used to detect outliers and high errors. In this regard, the system 10 supplements its estimate by indicating the appropriateness of the system 10 for a particular data point. The reliability measure is based on the reliability of the locational_value 23 and overall "averageness" of the subject property's physical attributes. These concepts are converted to a numerical measure using fuzzy sets. The resulting reliability measure varies continuously from zero (minimum) to one (maximum). The value of the reliability measure depends on the following factors, of which the first three are relevant because they influence locational_value 23 (which is one of the inputs to the system). The first factor is the number of sales that were used by the modeling step to construct the locational_value at the location of the subject property. The first factor is represented by the variable NumIn1mile, which is the approximate number of properties with sales records within a mile of the subject in the time period used. A value of fifty or more is preferred (reliability=1). If the value is less than twenty-five, the reliability is zero. Intermediate values lead to a reliability between zero and one. A fuzzy set (S-shaped) can be defined on the variable NumIn1mile. The second factor is the local variation in the locational_value's 23 dollar/sq. ft. surface. If the surface is flat where the subject is, then there is little variation in the immediate neighborhood, and the reliability should be high. This variation is specified by LocalVar, and is the standard deviation of dollar/sq. ft. values at the four corners of the grid cell in which the subject property is located. Preferably, a variation of less than four dollars/sq. ft. yields a reliability equal to one, and a variation exceeding thirteen dollars/sq. ft. yields reliability equal to zero, and intermediate values lead to a reliability between zero and one. The third factor is the living area of the subject. If the property is extremely small or extremely large, then there is less reliability in the estimate. A value between 1000 and 3800 sq. ft. is preferred (reliability=1). If the living area is less than 900 sq. ft. or more than 4200 sq. ft., the reliability is equal to zero. Intermediate values lead to a reliability between zero and one. The fourth factor is the atypicality of the subject. Sales in the subject property's five-digit ZIP have a mean and standard deviation associated with the subject property's physical features. The subject property is assigned a score based on how "far away" it is from these mean values. An average house gets a score of zero, whereas a high score is associated with an unusual property. An Atypicality score of zero to one is preferred (reliability=1), and if the score exceeds 1.5, reliability will be zero. Intermediate values lead to a reliability between zero and one. The fifth factor is the lot size. A lot size of at most 0.8 acres is preferred (reliability=1). A lot size greater than or equal to 1 acre leads to a zero reliability. Intermediate values yield a reliability between zero and one. The sixth factor is the total rooms. Preferably total rooms are six to twelve rooms (reliability=

1). Less than five or more than twelve total rooms results in a zero reliability value. Intermediate values lead to a reliability between zero and one. The reliability value is the conjunction of the six factors taken as the minimum of the individual reliabilities. This follows from the fuzzy conjunction (minimum) operator which ANDs all the above factors together. Notably, all of the specific thresholds can be easily changed.

Further improvement in E will largely be metric-driven, and is unlikely to be drastic since the market is both imperfect and inefficient, meaning that the ideally maximal information model will also have a residual. Alternatively, other artificial intelligence-based generative approaches can be used to solve problems where an input/output relationship has to be identified from data. For example, fuzzy systems and neural networks can be used in isolation. Each is capable of implementing a multi-input, single-output numeric map. By way of further example, non-artificial intelligence approaches such as statistical linear regression can also be used. In any event, the system approach provides a transparent explanation of the model in terms of a small number of rules that are comprehensible to a human. In addition, it implements a nonlinear regression model.

The system has at most 100–150 degrees of freedom. Consequently, not more than 1500–2000 well-chosen training examples are required to train the system. Thus, the size requirements on training data are modest. The computational cost can be easily handled by a typical workstation, even if for example, each county is updated with new data every three months. The decision to update is driven principally by the volatility of the economy, the needs of the business application, and the ease of maintenance required. Notably, testing the system on a subject property is computationally very fast and very simple. No database access is required. Only one property needs to be geocoded and its locational_value estimated. This function is performed by the locational value method, after which the system is equivalent to computing a single formula.

It is therefore apparent that there has been provided in accordance with the present invention, a method and system that fully satisfy the aims and advantages and objectives set forth herein. The invention has been described with reference to several embodiments, however, it will be appreciated that variations and modifications can be effected by a person of ordinary skill in the art without departing from the scope of the invention.

What is claimed is:

1. A computer-implemented method embedded in a recordable medium for estimating value of a subject property and providing a reliability measure of the estimated value, said method comprising the steps of:
   providing a generative system based on a combination of fuzzy logic systems and neural networks capable of accepting multiple inputs and providing a single output;
   retrieving data for multiple properties, the data for each property comprising multiple attributes and a selling price of the property;
   training said generative system using the retrieved data, using the attribute information of the data as inputs and adjusting said generative system to provide an output conforming with selling price of the property associated with the attribute information;
   providing attribute information regarding the subject property to the trained generative system;
   receiving the estimated value of the subject property from the trained generative system; and
   receiving the reliability measure of the estimated value from the trained generative system.

2. The method of claim 1, further comprising the steps of:
   providing a first system capable of providing a first estimate of the value of the subject property and a first reliability measure of the first estimate;
   obtaining from said first system a first estimate of the value of the subject property;
   obtaining from said first system a first reliability measure of said first estimate;
   providing said first estimate and said first reliability measure as inputs to the trained generative system.

3. The method of claim 1, wherein the reliability measure has a value in a range from zero to one.

4. The method of claim 1, wherein said multiple attributes comprise: total rooms of the property, number of bedrooms in the property, number of bathrooms in the property, size of living area, and lot size of the property.

5. The method of claim 1, further comprising the step of:
   validating the trained generative system.

6. The method of claim 1, wherein the generative system comprises a five-layer neural network.

7. The method of claim 2, wherein the step of providing the first estimate further comprises:
   retrieving the value, square footage and geographic location of multiple properties within a preselected geographic region;
   constructing a smooth function spanning a preselected geographic region that represents a dollar per square foot value at every point of longitude and latitude in the preselected geographic region;
   determining the estimated value of the subject property based on the geographical location and square footage thereof.

8. A system for estimating value of a subject property and providing a reliability measure of the estimated value, said system comprising:
   a generative system based on a combination of fuzzy logic systems and neural networks capable of accepting multiple inputs and providing a first estimate of the value of the subject property and a first reliability measure;
   wherein said generative system comprises:
      means for retrieving data for multiple properties comprising for each property information regarding multiple attributes and a selling price thereof;
      means for using the attribute information for each property as inputs; and
      means for adjusting said generative system to provide output of said generative system conforming to the value of the property associated with the attribute information.

9. The system claimed of claim 8, further comprising:
   a first system for retrieving value, square footage and geographic location of multiple properties within a preselected geographic region;
   said first system constructing a smooth function spanning the preselected geographic region that represents a dollar/sq. ft. value at every point of longitude and latitude in the preselected geographic region;
   said first system further determining a first estimated value of the subject property based on the geographic location and square footage thereof;
   said first estimated value comprising an input to said generative system.

10. The system of claim 8, wherein said generative system comprises a five-layered neural network.

* * * * *

UNITED STATES PATENT AND TRADEMARK OFFICE
CERTIFICATE OF CORRECTION

PATENT NO. : 6,748,369 B2
DATED : June 8, 2004
INVENTOR(S) : Pratap Shankar Khedkar et al.

It is certified that error appears in the above-identified patent and that said Letters Patent is hereby corrected as shown below:

Title page,
Item [56], References Cited, OTHER PUBLICATIONS, please insert the following references:

E. Kacapyr, "Introduction to Economic Forecasting", Consensus Forecasts, 1996, pages 3-16.

Robert T. Clemen, "Combining Forecasts: A Review and Annotated Bibliography", International Journal of Forecasting, 1989, pages 559-583.

Clive W. J. Granger, et al, "Improved Methods of Combining Forecasts", Journal of Forecasting, 1984, pages 197-204.

Stephen K. McNees, "Consensus Forecasts: Tyranny of the Majority", New England Economic Review, 1987, pages 14-21.

Piero P. Bonissone, et al, "Similarity Measures for Case-Based Reasoning Systems", Proc. Of The Fourth Int'l Conf. On Information Processing and Management of Uncertainty (IPMU-92) in Knowledge-Based Systems, 1992, pages 483-487.

Piero P. Bonissone, et al, "Financial Applications of Fuzzy Case-Based Reasoning to Residential Property Valuation", FUZZ-IEEE, 1997, pages 37-44.

Avelino J. Gonzalez, et al, "A Case-Based Reasoning Approach to Real Estate Property Appraisal", Expert Systems With Applications, 1992, pages 229-246.

Jyh-Shing Roger Jang, "ANFIS: Adaptive-Network-Based Fuzzy Inference System", IEEE Transactions on Systems, Man and Cybernetics, 1993, pages 665-685.

Tomohiro Takagi, et al, "Fuzzy Identification of systems and Its Applications to Modeling and Control", IEEE Transactions on Systems, Man and Cybernetics, 1985, pages 116-132.

LA Zadeh, "Fuzzy Sets", Information and Control, 1964, pages 28-44.

Signed and Sealed this

Twenty-eighth Day of December, 2004

JON W. DUDAS
*Director of the United States Patent and Trademark Office*